(12) United States Patent
Kimura et al.

(10) Patent No.: US 8,967,309 B2
(45) Date of Patent: Mar. 3, 2015

(54) CONSTRUCTION MACHINE

(75) Inventors: Shogo Kimura, Ritto (JP); Tomoyuki Tanaka, Yasu (JP); Hiroshi Tabeta, Konan (JP); Hajime Ishii, Higashiomi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/819,146

(22) PCT Filed: Oct. 20, 2011

(86) PCT No.: PCT/JP2011/074132
§ 371 (c)(1),
(2), (4) Date: Feb. 26, 2013

(87) PCT Pub. No.: WO2012/073611
PCT Pub. Date: Jun. 7, 2012

(65) Prior Publication Data
US 2013/0236281 A1 Sep. 12, 2013

(30) Foreign Application Priority Data
Nov. 29, 2010 (JP) .................................. 2010-265080

(51) Int. Cl.
E02F 3/00 (2006.01)
E02F 9/16 (2006.01)
B60H 1/00 (2006.01)
E02F 9/08 (2006.01)
E02F 3/32 (2006.01)

(52) U.S. Cl.
CPC .............. *E02F 9/16* (2013.01); *B60H 1/00378* (2013.01); *E02F 9/0858* (2013.01); *E02F 3/32* (2013.01); *E02F 3/325* (2013.01); *E02F 9/166* (2013.01); *B60H 2001/00221* (2013.01)

USPC .......................................................... 180/68.1

(58) Field of Classification Search
None
See application file for complete search history.

(56) References Cited

U.S. PATENT DOCUMENTS

| | | | |
|---|---|---|---|
| 6,290,286 B1 * | 9/2001 | Murakami et al. ........ | 296/190.09 |
| 6,615,942 B2 * | 9/2003 | Shinohara et al. .......... | 180/69.21 |
| 6,669,272 B2 * | 12/2003 | Ayabe et al. .............. | 296/190.08 |
| 6,729,831 B1 * | 5/2004 | Kawamura et al. ........... | 414/694 |
| 7,287,810 B2 * | 10/2007 | Ishii et al. ................. | 296/190.05 |
| 7,523,804 B2 * | 4/2009 | Tanaka et al. .................. | 180/291 |
| 7,530,418 B2 * | 5/2009 | Ishii et al. .................. | 180/89.12 |

(Continued)

FOREIGN PATENT DOCUMENTS

| | | |
|---|---|---|
| JP | 2004-142663 A | 5/2004 |
| JP | 2005-330771 A | 12/2005 |

(Continued)

*Primary Examiner* — Jeffrey J Restifo
*Assistant Examiner* — Erez Gurari
(74) *Attorney, Agent, or Firm* — Mattingly & Malur, PC

(57) ABSTRACT

An upper revolving structure (3) includes a revolving frame (5), a floor member (9) which is provided on the revolving frame (5) and a front side of which serves as a footrest section (11) on which an operator rests his or her feet, a cab box (17) which forms an operating room (18) above the floor member (9), and an indoor unit (23) disposed on the floor member (9) to supply sucked air as conditioned air. A lower surface (11B) side of the footrest section (11) of the floor member (9) is formed as a unit mounting surface (12), and, as for the indoor unit (23), a box body (24) is disposed on the lower side of the unit mounting surface (12) and, in this state, the box body (24) is mounted on the unit mounting surface (12) by means of a plurality of bolts (32).

6 Claims, 15 Drawing Sheets

(56) References Cited

U.S. PATENT DOCUMENTS

| | | | |
|---|---|---|---|
| 7,730,648 B2* | 6/2010 | Fukaya | 37/443 |
| 7,900,996 B2* | 3/2011 | Kimura et al. | 296/190.09 |
| 8,096,608 B2* | 1/2012 | Andou et al. | 296/190.05 |
| 2003/0047965 A1* | 3/2003 | Ayabe et al. | 296/190.08 |
| 2004/0098983 A1* | 5/2004 | Naruse et al. | 60/428 |
| 2005/0166429 A1* | 8/2005 | Tanaka et al. | 37/466 |
| 2006/0170251 A1 | 8/2006 | Ishii et al. | |
| 2006/0185200 A1* | 8/2006 | Sugiyama et al. | 37/466 |
| 2006/0266573 A1* | 11/2006 | Ishii et al. | 180/326 |
| 2008/0035401 A1* | 2/2008 | Ishii et al. | 180/89.12 |
| 2009/0309343 A1* | 12/2009 | Fujii et al. | 280/762 |
| 2010/0102594 A1* | 4/2010 | Kimura et al. | 296/190.01 |
| 2010/0301635 A1* | 12/2010 | Andou et al. | 296/190.05 |
| 2011/0017537 A1* | 1/2011 | Andou et al. | 180/89.16 |
| 2012/0134768 A1* | 5/2012 | Kimura et al. | 414/687 |

FOREIGN PATENT DOCUMENTS

| | | |
|---|---|---|
| JP | 2005-330772 A | 12/2005 |
| JP | 2006-002479 A | 1/2006 |
| JP | 2007-198057 A | 8/2007 |
| WO | 2004/078562 A1 | 9/2004 |

* cited by examiner

CONSTRUCTION MACHINE

TECHNICAL FIELD

The present invention relates to a construction machine such as a hydraulic excavator having an indoor unit on a floor member.

BACKGROUND ART

Generally, a hydraulic excavator as a construction machine is largely constituted by an automotive lower traveling structure, an upper revolving structure which is swingably mounted on the lower traveling structure, and a working mechanism liftably mounted on the front side of the upper revolving structure.

The upper revolving structure is largely constituted by a revolving frame which forms a support structure; an engine provided on the rear side of the revolving frame to drive a hydraulic pump; a floor member provided on the revolving frame by being located on the front side of the engine, a rear side of which serves as an operator's seat mounting section for mounting an operator's seat, and a front side of which serves as a footrest section on which an operator rests his or her feet; a cab box provided so as to cover the surroundings and the upper side of the floor member to form an operating room above the floor member; and an air conditioner for supplying conditioned air to the operating room so as to improve the working environment of the operating room.

Here, the air conditioner is formed by connecting an outdoor unit on the engine side and an indoor unit on the floor member side by means of refrigerant pipes. The outdoor unit on the engine side is configured by including a condenser which is located midway in the refrigerant pipes and cools the refrigerant by the cooling air generated by a cooling fan of the engine. The indoor unit on the floor member side is configured by including a fan for generating a flow of air directed toward the operating room, as well as an evaporator which effects heat exchange at the time of expansion of the compressed refrigerant and cools the air generated by the fan and/or a heater core for heating through which engine cooling water circulates.

Meanwhile, among hydraulic excavators, there are small-sized hydraulic excavators called mini excavators which are suitable for operation in narrow work sites and in this small-sized hydraulic excavator, the upper revolving structure is formed to be small so as to be able to revolve even in narrow places.

In the small-sized hydraulic excavator, since the operating room is narrow, the indoor unit is disposed at the operator's foot. Namely, a large opening is provided in a footrest section of a floor member, and a bottomed box-shaped tray which is downwardly recessed is mounted in this opening. The indoor unit is disposed in this tray, and the upper side of the indoor unit is arranged to be covered with a cover (Patent Document 1).

PRIOR ART DOCUMENT

Patent Document

Patent Document 1: Japanese Patent Laid-Open No. 2006-2479 A

SUMMARY OF THE INVENTION

Incidentally, the hydraulic excavator is such as to be operated on waste land and muddy places, and the interior of the operating room becomes soiled as mud and the like attached to the operator's shoes come off, so that the interior of the operating room is sometimes washed with water. In this case, with the hydraulic excavator according to Patent Document 1, the box-shaped tray is provided in the opening of the footrest section of the floor member, and the indoor unit is accommodated in this tray. For this reason, a seal member must be provided between the footrest section and the cover in order that water does not enter the indoor unit even when the interior of the operating room is washed with water. Moreover, with the hydraulic excavator according to Patent Document 1, in order to dispose the indoor unit, the opening is processed in the footrest section of the floor member, the box-shaped tray to be mounted in this opening is fabricated, and the cover for covering the upper side of the indoor unit is fabricated, so that there is a problem in that the number of parts and man-hour for processing increase.

In view of the above-discussed problems with the prior art, it is an object of the present invention to provide a construction machine which makes it possible to dispose the indoor unit on the footrest section of the floor member with a small number of parts and less man-hour while water is prevented from entering the indoor unit at the time of washing the interior of the operating room with water.

(1) A construction machine in accordance with the present invention includes an automotive lower traveling structure, an upper revolving structure which is swingably mounted on the lower traveling structure, and a working mechanism liftably mounted on the upper revolving structure, the upper revolving structure being provided with a revolving frame forming a support structure; a floor member which is provided on the revolving frame, a rear side of which serves as an operator's seat mounting section for mounting an operator's seat, and a front side of which serves as a footrest section on which an operator rests his or her feet; a cab box which is provided in such a manner as to cover surroundings and an upper side of the floor member to form an operating room above the floor member and which has on one side thereof a door which is opened and closed when the operator enters and exits; and an indoor unit which is disposed on the floor member and constitutes a part of an air conditioner for supplying sucked air into an interior of the operating room as conditioned air.

The characteristic of the construction adopted in the present invention to solve the above-described problems lies in that the footrest section has its lower surface side used as a unit mounting surface for mounting the indoor unit thereon, and the indoor unit is arranged to be disposed in a suspended state on the unit mounting surface by being mounted on the unit mounting surface by means of fastening members.

With this arrangement, the lower surface side of the footrest section of the floor member is used as the unit mounting surface, and the indoor unit is abutted against this unit mounting surface from below and in this state, the indoor unit is mounted on the unit mounting surface by means of the fastening members. In consequence, the indoor unit can be disposed in a suspended state on the lower surface (unit mounting surface) of the footrest section.

Accordingly, since the footrest section of the floor member is sufficient if the indoor unit can be mounted to the unit mounting surface of the lower surface side, it is unnecessary to additionally provide special processing or parts, so that the footrest section can be formed as a simple flat surface.

As a result, since it is unnecessary for an opening for disposing the indoor unit to be provided in the footrest section of the floor member, it is possible to reliably prevent water from entering the indoor unit at the time of washing the interior of the operating room with water, without needing to separately provide a seal member or the like. In consequence, at the time of washing the interior of the operating room with water, the cleaning operation can be performed efficiently since it is unnecessary to give extra consideration to the indoor unit being splashed with water. Furthermore, it is possible to reduce the number of parts such as the seal member, the tray, and the cover as well as man-hour for processing the footrest section.

(2) According to the present invention, a plurality of female screw holes are provided in the footrest section by being located in peripheries of the unit mounting surface, fastening member insertion holes are provided in the indoor unit at positions corresponding to the female screw holes, and the indoor unit is arranged to be fastened to the unit mounting surface as the fastening members inserted in the fastening member insertion holes are threadedly secured to the female screw holes.

With this arrangement, the indoor unit is abutted from below against the unit mounting surface on the lower surface side of the footrest section, and the female screw holes provided in the peripheries of the unit mounting surface of the footrest section and the fastening member insertion holes of the indoor unit are positioned. In this state, the fastening members are inserted in the fastening member insertion holes and are threadedly secured to the female screw holes. In consequence, the indoor unit can be simply mounted to the unit mounting surface by using the fastening members, and can be simply dismounted by loosening the fastening members.

(3) According to the present invention, the indoor unit is configured by including a box body constituted by a closed structure having a bottom surface, peripheral surfaces, and a top surface which form an outer shell thereof, a fan disposed in the box body to generate a flow of air, and an evaporator and/or a heater core disposed in the box body to condition air, and the indoor unit is mounted on the unit mounting surface in a state in which the top surface of the box body is opposed to the unit mounting surface of the footrest section.

With this construction, as the top surface of the box body having a closed structure which forms the outer shell of the indoor unit is opposed to the unit mounting surface of the footrest section, the indoor unit in this state can be mounted on the unit mounting surface in a suspended state.

(4) According to the present invention, the indoor unit is configured by including a box body of a frame-like structure whose upper side is opened and having a bottom surface and peripheral surfaces which form an outer shell thereof, a fan disposed in the box body to generate a flow of air, and an evaporator and/or a heater core disposed in the box body to condition air, and the unit mounting surface of the footrest section is able to form a closing surface which closes an upper side of the box body when the box body is mounted on the unit mounting surface.

With this arrangement, as the box body whose upper side is open is mounted on the unit mounting surface of the footrest section, the upper side of the box body can be closed by making use of the unit mounting surface as the closing surface. Accordingly, since the vertical dimension of the box body can be made small by the amount in which the top surface is omitted, the height dimension of the upper revolving structure can be reduced to a low level, making it possible to enhance stability during traveling and work operation. Meanwhile, the accommodating space on the lower side of the floor member above the revolving frame can be made large. Furthermore, at the time of performing inspection operation or repair operation of the indoor unit, by merely dismounting the indoor unit from the footrest section it is possible to inspect or repair the fan, the evaporator, the heater core, and the like inside it without needing to disassemble the box body.

(5) In the present invention, the box body in a plan view is formed in a rectangular shape extending in a left-right direction, air intake ports for admitting air are provided in the box body by being located on a side of the door of the cab box, and air outlet ports for discharging the conditioned air are provided in the box body by being located on an opposite side to the door, the evaporator and/or the heater core being arranged to be disposed between the air intake ports and the air outlet ports inside the box body.

With this arrangement, the rectangular box body extending in the left-right direction is able to admit air from the air intake ports provided on the door side of the cab box. The air admitted from the air intake ports can be regulated to a desired temperature by the evaporator and the heater core, and this conditioned air can be supplied to the operating room by being discharged from the air outlet ports disposed on the opposite side in the left-right direction to the door.

BRIEF DESCRIPTION OF THE DRAWINGS

FIG. 4 is an external perspective view taken from the upper front side, illustrating the floor member, an operator's seat, various operating levers/pedals, and the like.

MODE FOR CARRYING OUT THE INVENTION

Hereafter, a construction machine which is applied to an embodiment of the present invention will be in detail explained with reference to the accompanying drawings FIG. 1 to FIG. 13, by taking a hydraulic excavator of cab specifications as an example.

FIGS. 1 to 9 show a construction machine in accordance with a first embodiment. The characteristic of this embodiment lies in that the box body of the indoor unit is formed as a closed structure having a bottom surface, peripheral surfaces, and a top surface, and the indoor unit is arranged to be mounted in a state in which the top surface of the box body is opposed to a unit mounting surface of a footrest section.

Figure 1:
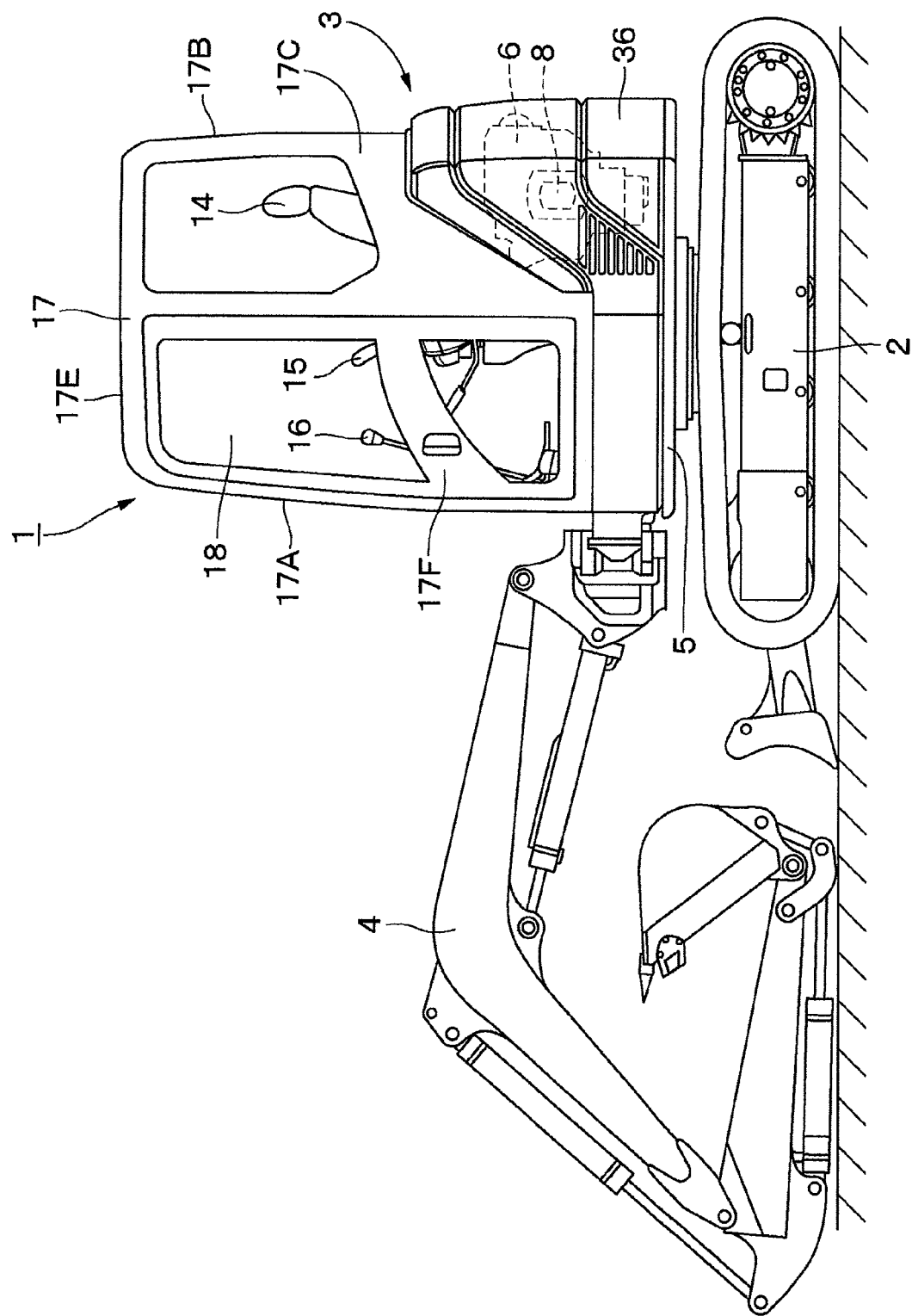
FIG. 1 is a front view illustrating a hydraulic excavator which is applied to a first embodiment of the present invention.

In FIG. 1, designated at 1 is a hydraulic excavator of the cab specifications as a construction machine which is applied to this embodiment, and the hydraulic excavator 1 is a small-sized hydraulic excavator called a mini excavator which is suitable for operation in narrow work sites. The hydraulic excavator 1 is largely constituted by an automotive lower traveling structure 2, an upper revolving structure 3 which is swingably mounted on the lower traveling structure 2, and a working mechanism 4 provided on the front side in the front-rear direction of the upper revolving structure 3 to perform the excavating operation of earth and sand.

Figure 2:
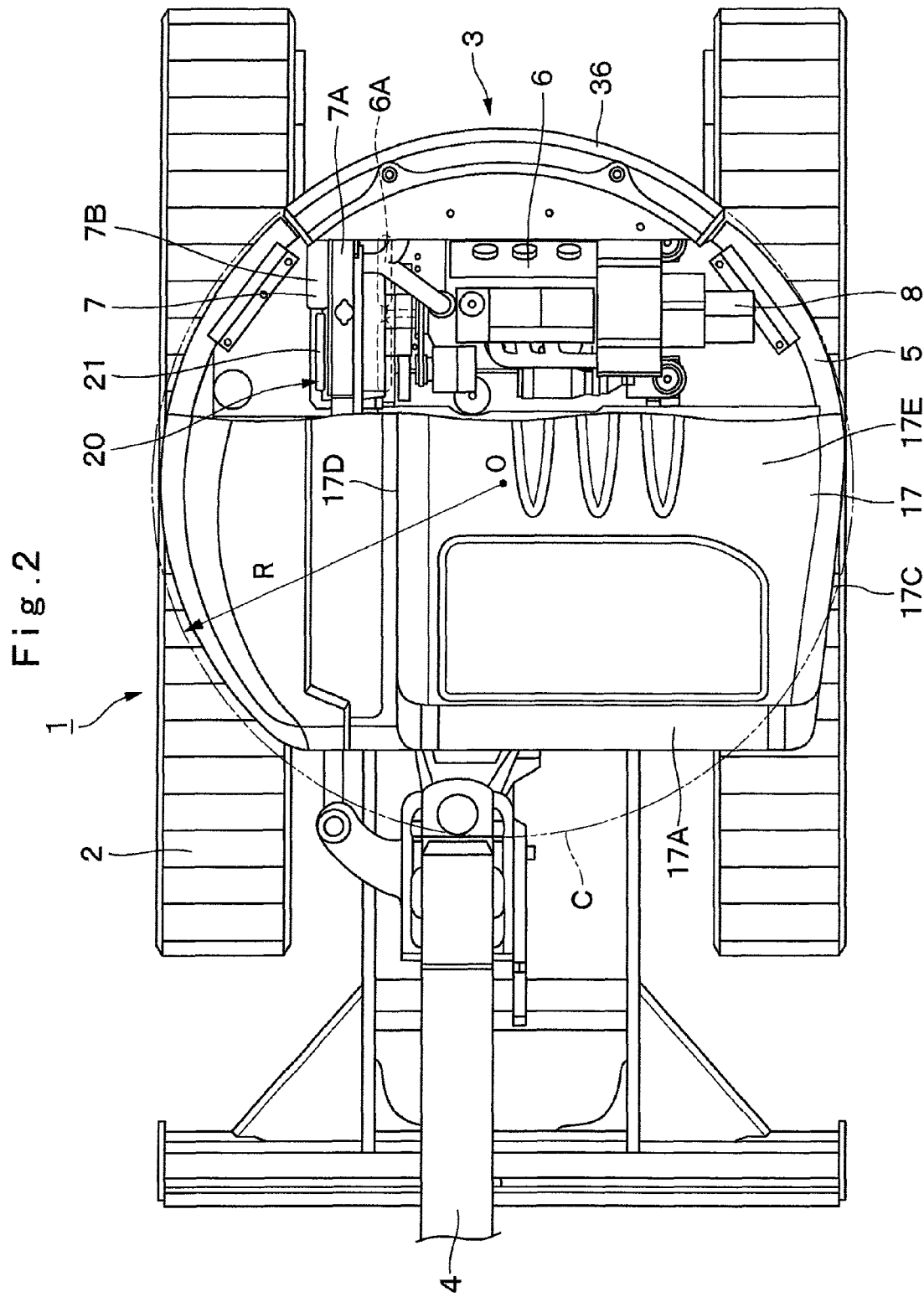
FIG. 2 is a plan view which is partly cut away illustrating the hydraulic excavator in enlarged form.

Here, as shown in FIG. 2, the upper revolving structure 3 has a width dimension in the left-right direction which is substantially equal to the vehicle width of the lower traveling structure 2, and is formed in a substantially circular shape, as viewed from above, so as to be accommodated within an imaginary circle C having a revolving radius R with a revolving center O as a center. In consequence, the hydraulic excavator 1 is configured as a rear small turn type hydraulic excavator in which when the upper revolving structure 3 revolves on the lower traveling structure 2 about the revolving center O as a center, a rear surface of a below-described counterweight 36 is accommodated substantially within the vehicle width of the lower traveling structure 2.

It should be noted that the aforementioned revolving radius R is defined by the distance from the revolving center O to the rear surface of the counterweight 36, and the aforementioned imaginary circle C is a locus of the rear surface of the counterweight 36 when the upper revolving structure 3 revolves.

The upper revolving structure 3 is constituted by such as a revolving frame 5, a floor member 9, an operator's seat 14, a cab box 17, an indoor unit 23, bolts 32, an air conditioner duct 33, and a counterweight 36 which will be described hereinafter.

The revolving frame 5 forms a support structure of the upper revolving structure 3 mounted on the lower traveling structure 2. The working mechanism 4 is mounted swingably and liftably on the front side of the revolving frame 5.

An engine 6 is mounted on the rear side of the revolving frame 5, and the engine 6 is disposed in a transversely mounted state in which it extends, for example, in the left-right direction. A heat exchanger 7 is provided on the right side of the engine 6 in such a manner as to oppose a cooling fan 6A, and a hydraulic pump 8 is disposed on the left hand side thereof. The heat exchanger 7 is configured by including such as a radiator 7A connected to a water jacket 6B for cooling the engine 6, an oil cooler 7B for cooling operating oil for driving various actuators, and a condenser 21 of a below-described outdoor unit 20.

Figure 3:
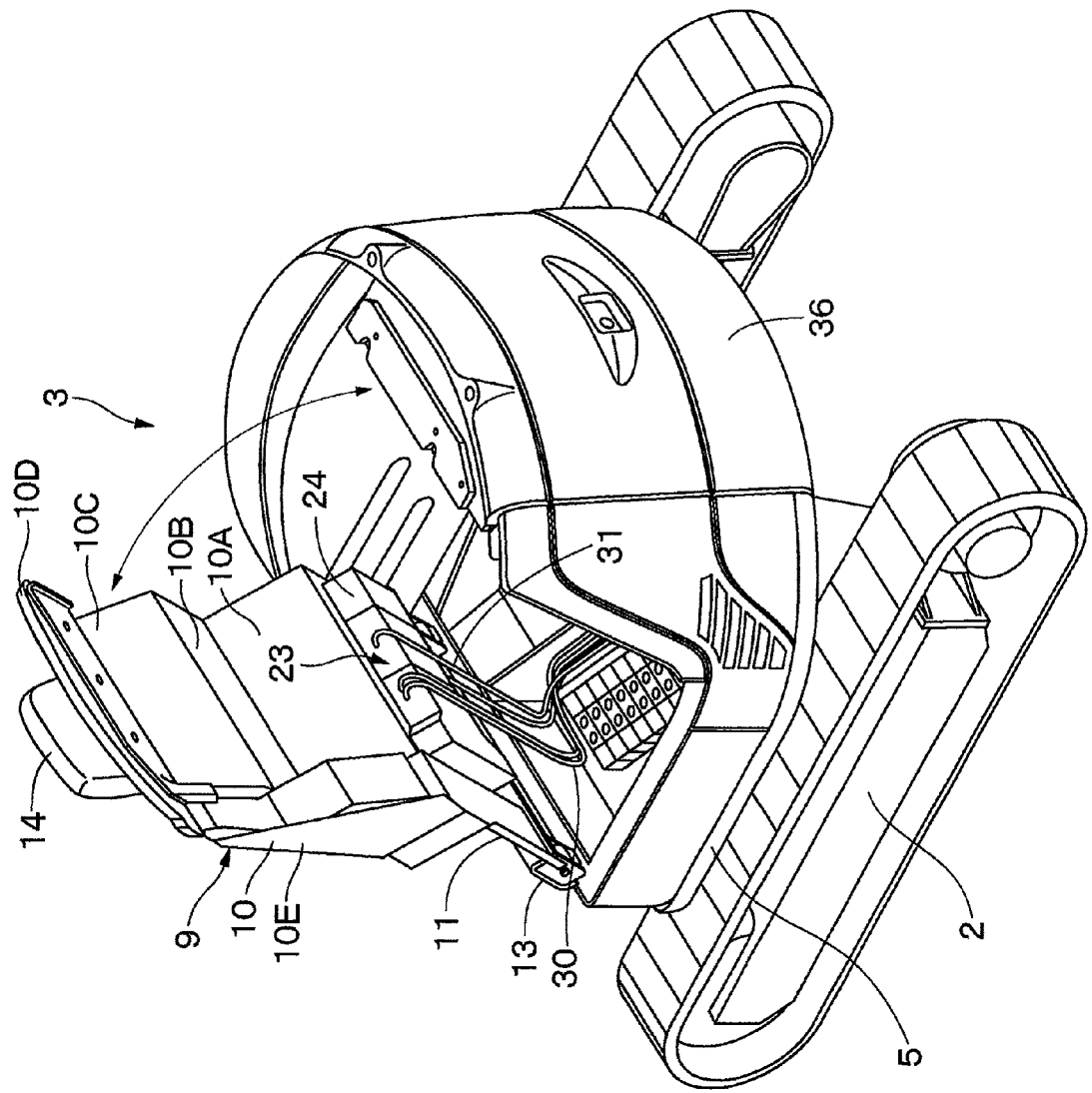
FIG. 3 is an external perspective view, taken from the rear side, of the hydraulic excavator with a working mechanism and a cab box omitted and with a floor member tilted up.

Indicated at 9 is the floor member provided on the revolving frame 5 nearer the left side. As shown in FIG. 3, this floor member 9 is tiltably supported at its front side position by the revolving frame 5 at its front side position and is supported at its rear side position on an upper portion of the below-described counterweight 36. In consequence, the floor member 9 together with the operator's seat 14, the cab box 17, the indoor unit 23, the air conditioner duct 33, and the like can be tilted up (the state of FIG. 3) and tilted down (the state of FIG. 1) by using the front side position as a fulcrum. When the floor member 9 is tilted down, a below-described mounting plate 10D is supported in a vibration isolated manner on the counterweight 36. Here, as shown in FIGS. 4 to 7, the floor member 9 is largely constituted by an operator's seat mounting section 10, a footrest section 11, and a lever/pedal mounting section 13 which will be described hereinafter.

The operator's seat mounting section 10 is formed in a stepped shape by being located on the rear side of the floor member 9, and the operator's seat mounting section 10 is for mounting the below-described operator's seat 14 thereon. This operator's seat mounting section 10 is largely constituted by a front plate 10A extending upwardly from a rear portion of the footrest section 11, a substantially flat placing plate 10B extending rearwardly from an upper portion of the front plate 10A to mount the operator's seat 14 thereon, a back plate 10C extending upwardly from a rear portion of the placing plate 10B, the mounting plate 10D extending rearwardly from an upper portion of the back plate 10C, and a left side plate 10E extending rearwardly from the front plate 10A along left-side edges of the placing plate 10B and the back plate 10C.

Here, an internal air filter (not shown) for removing dust in the internal air which is supplied to the below-described indoor unit 23, for example, is provided on the front plate 10A of the operator's seat mounting section 10 by being located on the front side of the operator's seat 14. Correspondingly, internal air inlet ports 10F for allowing the internal air to flow in toward the internal air filter is provided in front portions of the placing plate 10B. Due to being provided in the placing plate 10B, these internal air inlet ports 10F are made difficult to suck in the cool air around the operator's feet, and cause the air which has been heated to some extent to be sucked in by the below-described indoor unit 23, thereby making it possible to enhance the heating efficiency.

The footrest section 11 of the floor member 9 is for the operator seated in the operator's seat 14 to rest his or her feet thereon, and is provided on the front side of the operator's seat mounting section 10. The footrest section 11 is formed as a substantially rectangular flat plate which is elongated in the left-right direction. Namely, the footrest section 11 has an upper surface 11A on which the operator's feet rest and a lower surface 11B on which the below-described indoor unit 23 is mounted.

Three outlet port mounting openings 11C, 11D, and 11E, for example, are provided on the right end side of the footrest section 11 in such a manner as to extend in the front-rear direction. A front side air outlet port 24J of a box body 24 of the indoor unit 23, which allows conditioned air directed toward the front side of a below-described operating room 18 and toward the operator seated in the operator's seat 14 to flow out, is disposed at the outlet port mounting opening 11C located on the front side among the three outlet port mounting openings 11C, 11D, and 11E. A foot side air outlet port 24K, which allows conditioned air directed toward the operator's feet to flow out, is disposed at the outlet port mounting opening 11D located on the rear side of the outlet port mounting opening 11C. Further, a rear side air outlet port 24L, which allows conditioned air directed toward the rear side of the operating room 18 to flow out, is disposed at the outlet port mounting opening 11E located on the left side of the outlet port mounting opening 11D.

Figure 5:
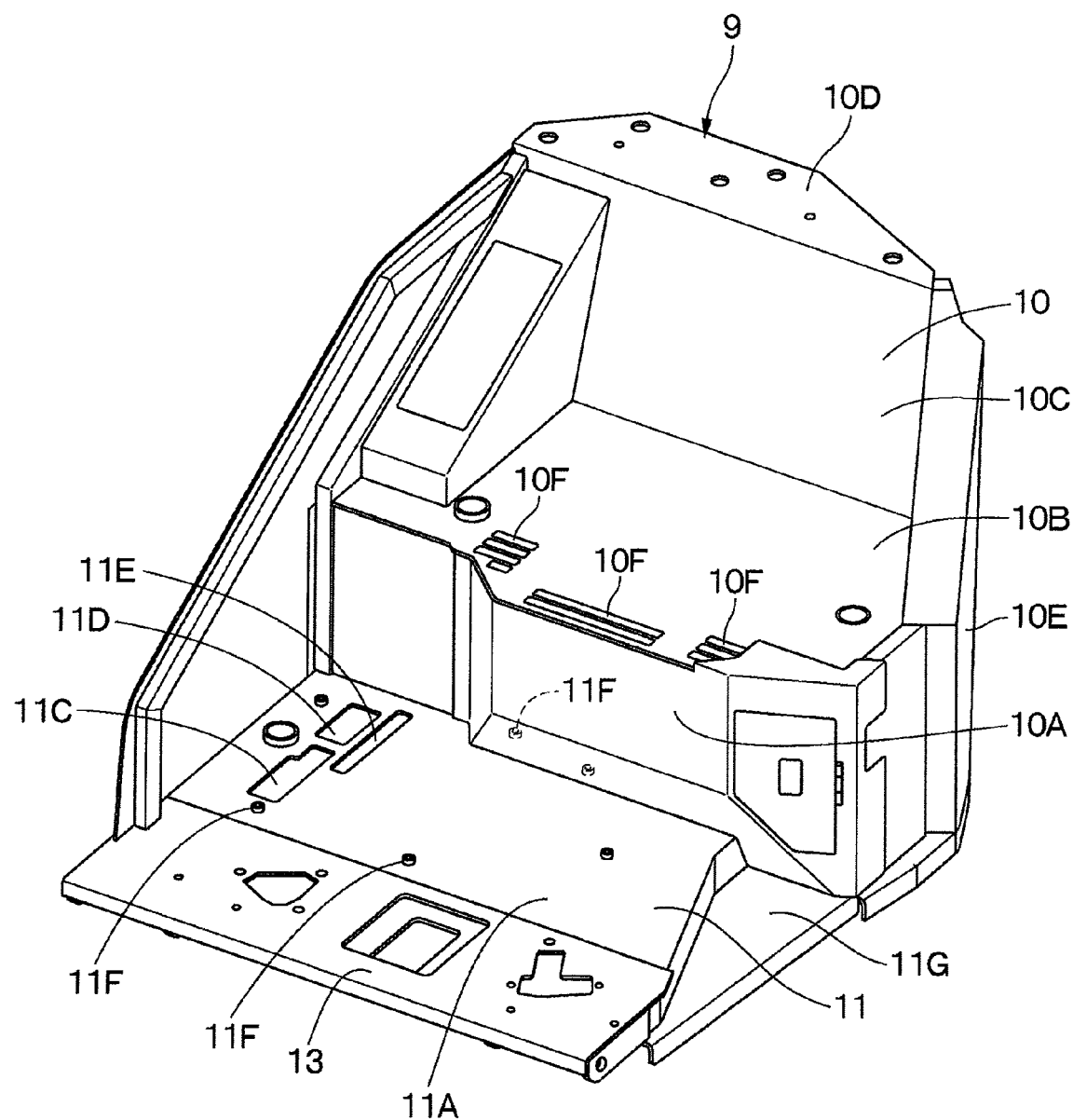
FIG. 5 is an external perspective view taken from the upper front side, illustrating the floor member as a single unit.
Figure 6:
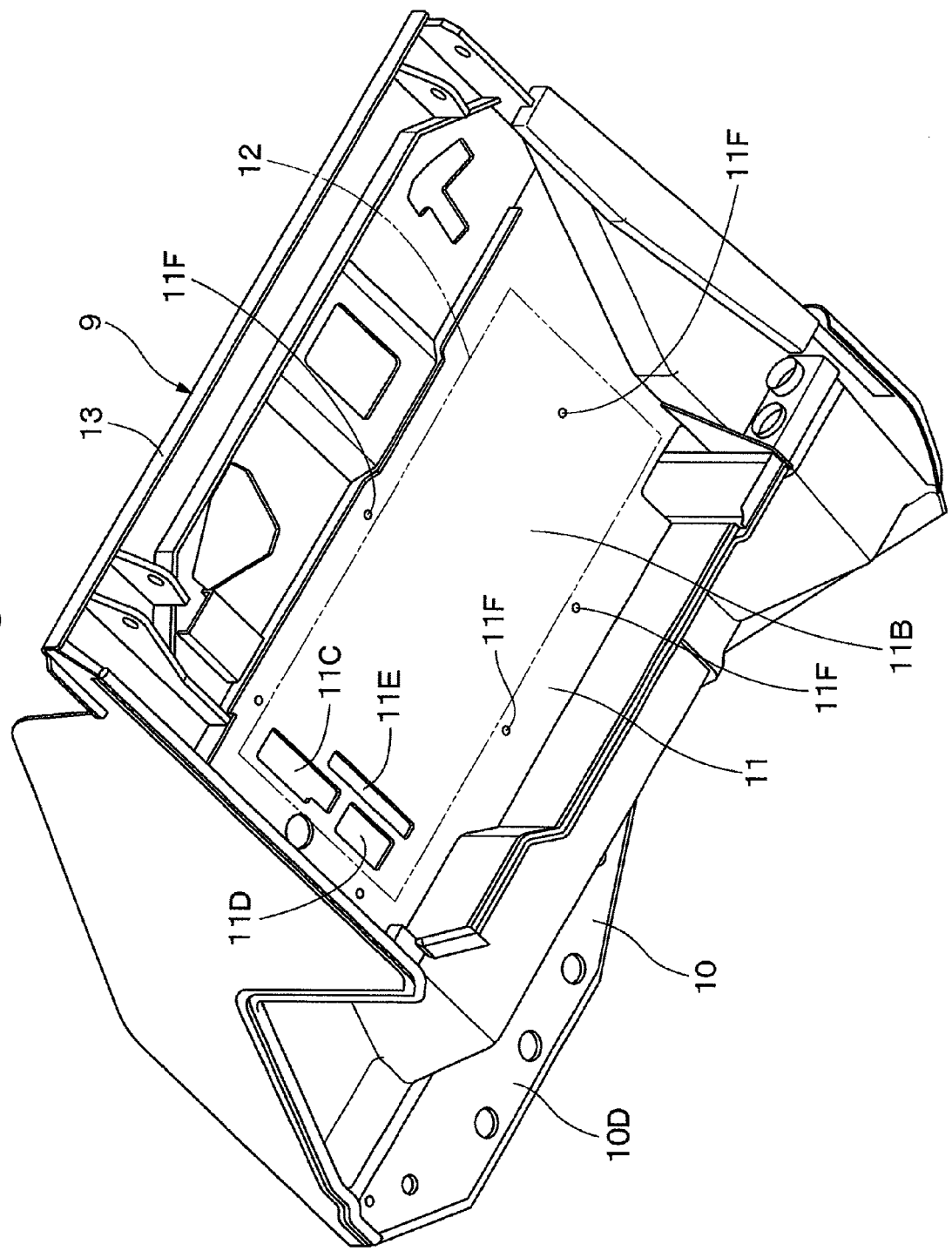
FIG. 6 is an external perspective view taken from the lower front side, illustrating the floor member as a single unit.

As shown in such as FIGS. 5 and 6, a plurality of female screw holes 11F, in which the below-described bolts 32 for mounting the indoor unit 23 are threadedly secured, are provided at six locations in the upper surface 11A of the footrest section 11 by being located in the surroundings of a below-described unit mounting surface 12. These female screw holes 11F at the six locations are arranged at positions corresponding to bolt through holes 24G at six locations which are provided in the surroundings of the below-described box body 24. Here, each of the female screw holes 11F is formed by, for example, welding a weld nut to a through hole bored in the footrest section 11.

It should be noted that the left end of the footrest section 11, which is on a door 17F side of the below-described cab box 17, serves as a step-like footstep section 11G for the operator to step on when getting into or out of the operating room 18.

The unit mounting surface 12 is provided on the lower surface 11B side of the footrest section 11, and the below-described indoor unit 23 is mounted on this unit mounting surface 12. Specifically, the unit mounting surface 12 is provided in a range in which the box body 24 of the indoor unit 23 abuts in the lower surface 11B of the footrest section 11, namely, in a range indicated by two-dot chain lines in FIG. 6. The indoor unit 23 is directly mounted on this unit mounting surface 12 in a suspended state such that the box body 24 is opposed thereto.

Figure 4:
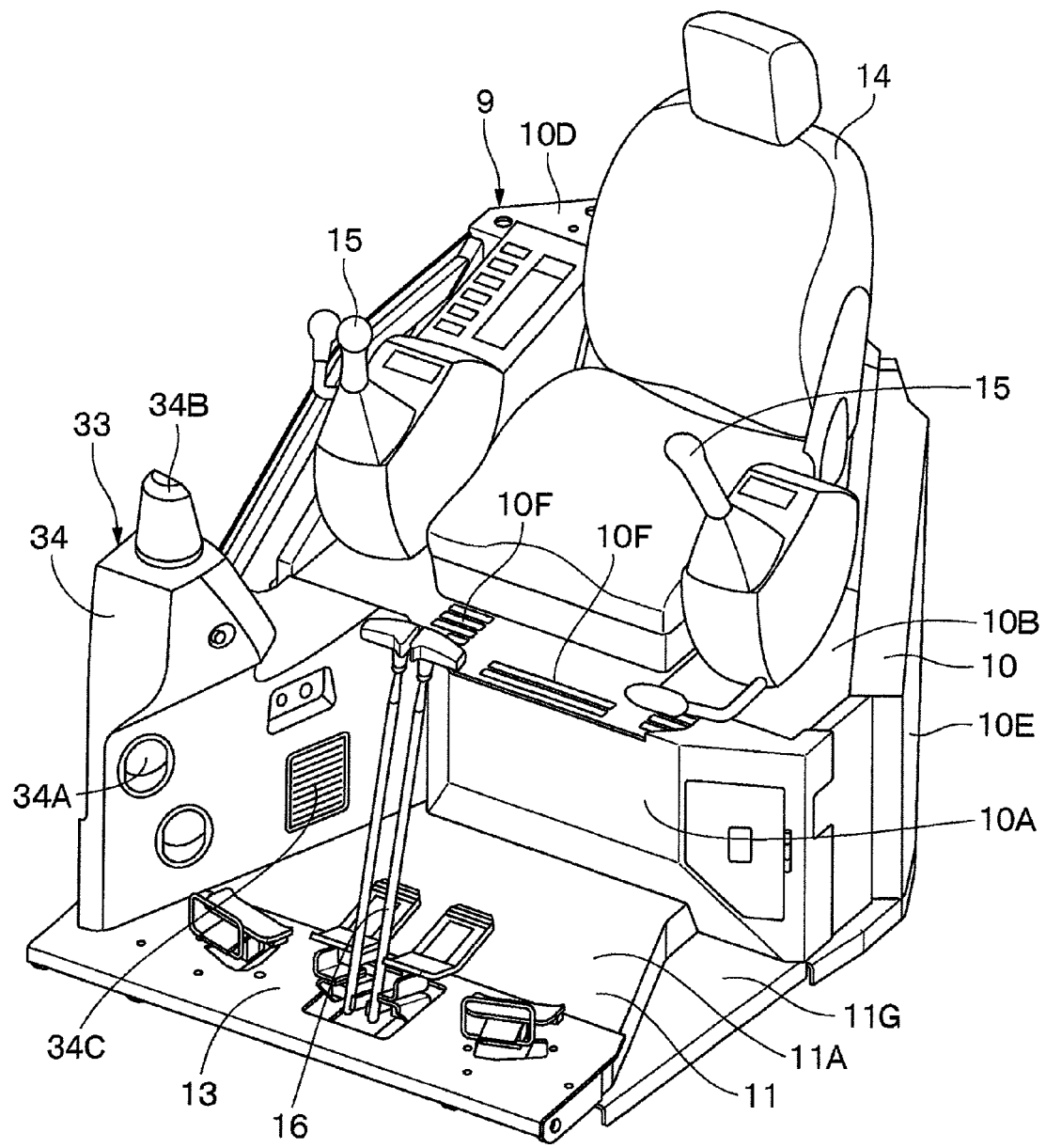

The lever/pedal mounting section 13 is provided on the front side of the footrest section 11, and the lever/pedal mounting section 13 extends in the left-right direction along the front end of the footrest section 11. As shown in FIG. 4, below-described operating levers/pedals 16 for traveling and the like are mounted on the lever/pedal mounting section 13.

The operator's seat 14 is provided on the floor member 9, and the operator's seat 14 is placed in a central position in the left-right direction of the placing plate 10B for constituting the operator's seat mounting section 10. This operator's seat 14 is for the operator to be seated therein when operating the hydraulic excavator 1. As shown in FIG. 4, operating levers 15 for work operation for operating the working mechanism 4 and the like are disposed on both left and right hand sides of the operator's seat 14. The operating levers/pedals 16 for traveling and the like, which are operated by manual operation or pedal operation when the lower traveling structure 2 is caused to travel, are provided on the lever/pedal mounting section 13 located in front of the operator's seat 14.

The cab box 17 is provided on the floor member 9, and the cab box 17 is for covering the surroundings and the upper side of the floor member 9. The cab box 17 is formed into a box shape by a front panel 17A, a rear panel 17B, a left side panel 17C, a right side panel 17D, and a top panel 17E, and its lower end portions are affixed to peripheral edges of the floor member 9. In consequence, the cab box 17 forms above the floor member 9 the operating room 18 which serves as an occupying space for the operator.

The door 17F is openably provided in the left side panel 17C forming a side surface of the cab box 17 by being located close to a front side corresponding to the footrest section 11 of the floor member 9. This door 17F is for opening and closing an entrance way provided on the left side of the footrest section 11.

Next, an air conditioner 19 which is provided on the upper revolving structure 3 to supply conditioned air into the operating room 18 will be explained.

Figure 13:
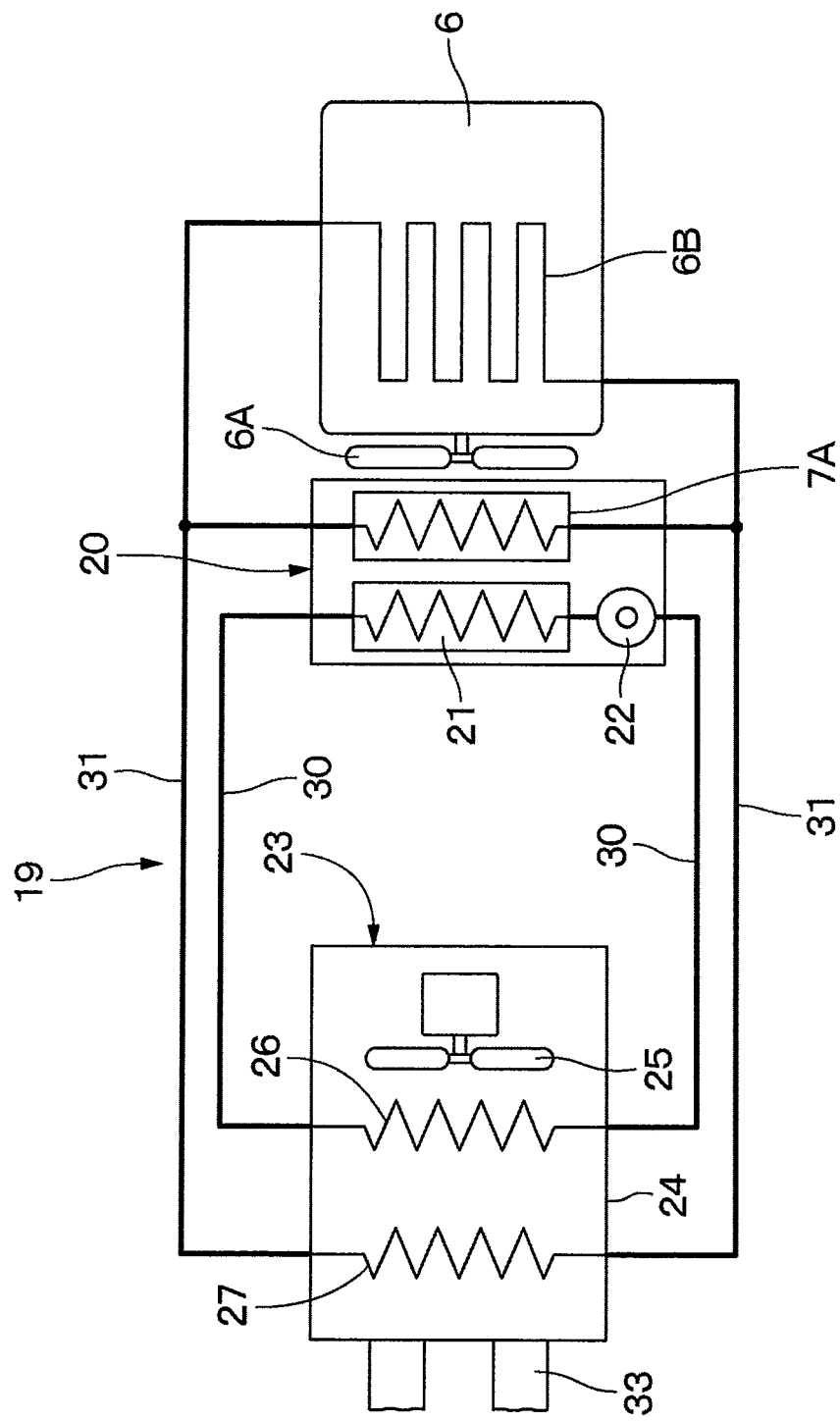
FIG. 13 is a circuit diagram illustrating an outdoor unit and the indoor unit of an air conditioner together with an engine.

Namely, designated at 19 is the air conditioner which is used in the first embodiment. As shown in FIG. 13, this air conditioner 19 is constituted by the outdoor unit 20 provided on the engine 6 side, the indoor unit 23 provided on the floor member 9 side, and refrigerant pipes 30 and hot water pipes 31 for connecting the outdoor unit 20 and the indoor unit 23.

The outdoor unit 20 is provided on the engine 6 side, and the outdoor unit 20 is disposed on the front side of the radiator 7A. This outdoor unit 20 is constituted by the condenser 21 which liquefies the vaporized refrigerant by cooling it, a receiver dry 22 which is provided on the downstream side of the condenser 21 and is adapted to separate the liquefied refrigerant into a gas and a liquid while temporarily storing the liquefied refrigerant, and the radiator 7A of the heat exchanger 7 for supplying hot water into a below-described heater core 27.

Figure 8:
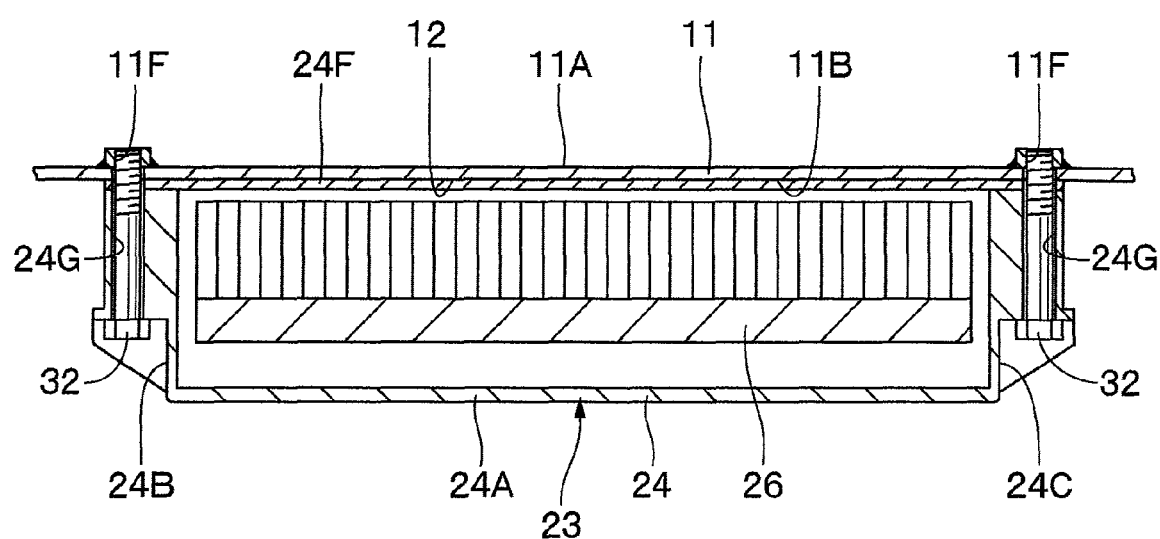
FIG. 8 is an enlarged cross-sectional view, taken from the direction of arrows VIII-VIII in FIG. 7, of the state in which the indoor unit is mounted on the lower surface side of the footrest section.

Designated at 23 is the indoor unit in accordance with the first embodiment for constituting the air conditioner 19. As shown in FIG. 8, this indoor unit 23 is directly mounted in a suspended state on the unit mounting surface 12 provided on the lower surface 11B side of the footrest section 11 of the floor member 9. The indoor unit 23 together with the aforementioned outdoor unit 20 constitutes the air conditioner 19. Here, the indoor unit 23 sucks in internal air inside the operating room 18 or external air outside the operating room 18, converts it into conditioned air regulated to a desired temperature and humidity, and supplies it from the below-described air conditioner duct 33 into the operating room 18.

Figure 10:
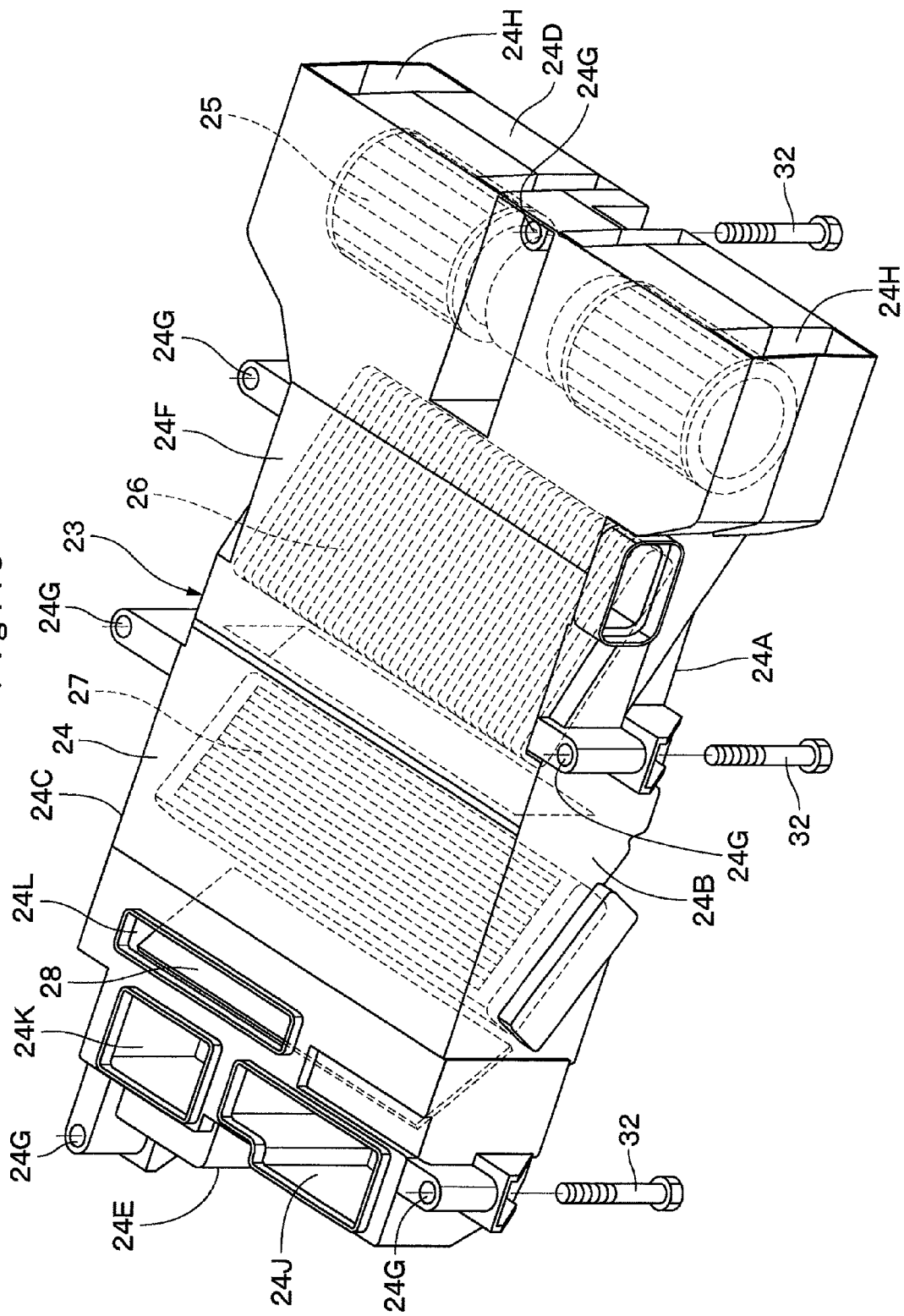
FIG. 10 is an external perspective view illustrating in enlarged form the indoor unit together with bolts in accordance with the first embodiment.
Figure 11:
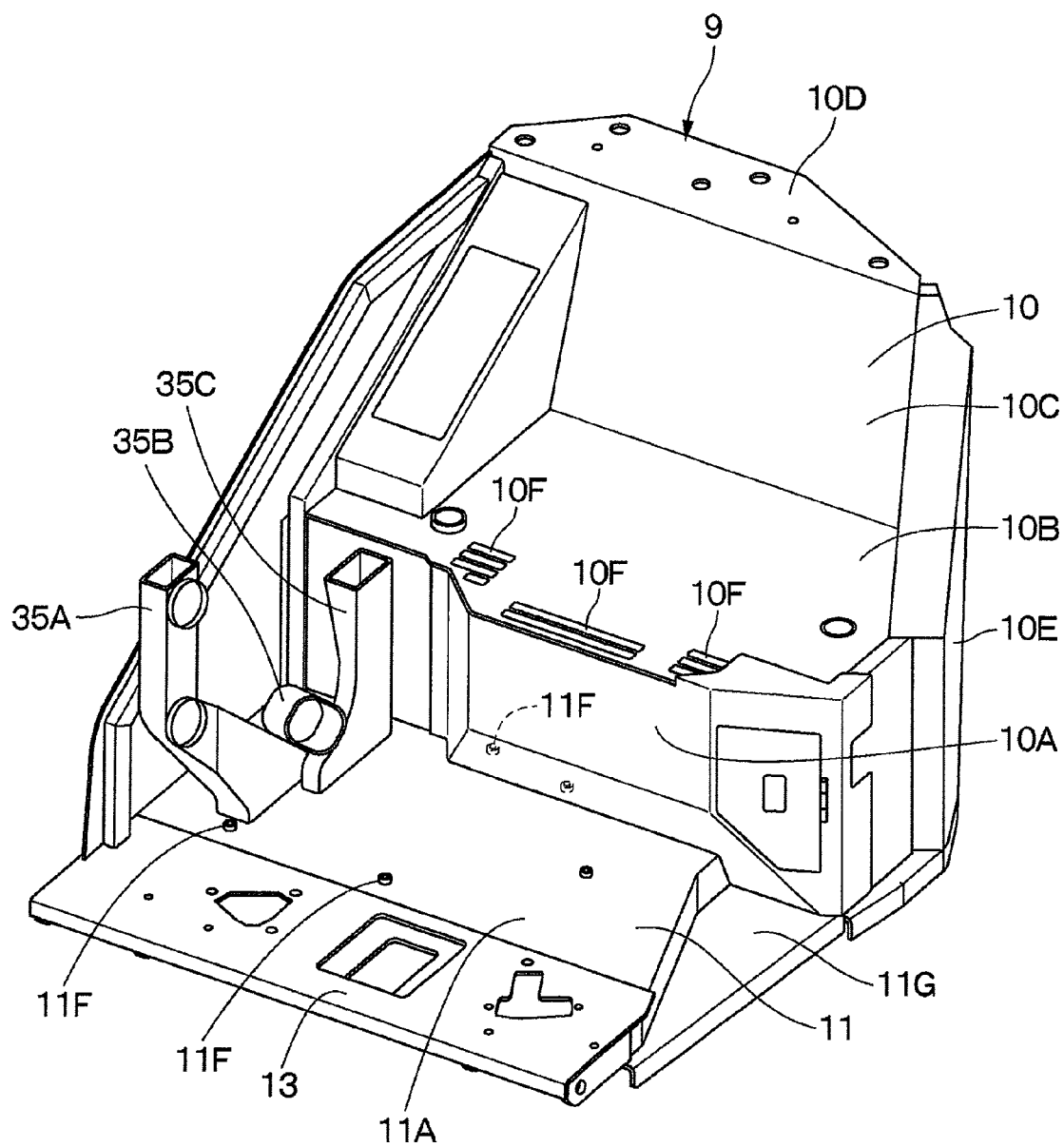
FIG. 11 is an external perspective view, taken from the same position as in FIG. 5, of a state in which air conditioner ducts are provided on the footrest section of the floor member.
Figure 12:
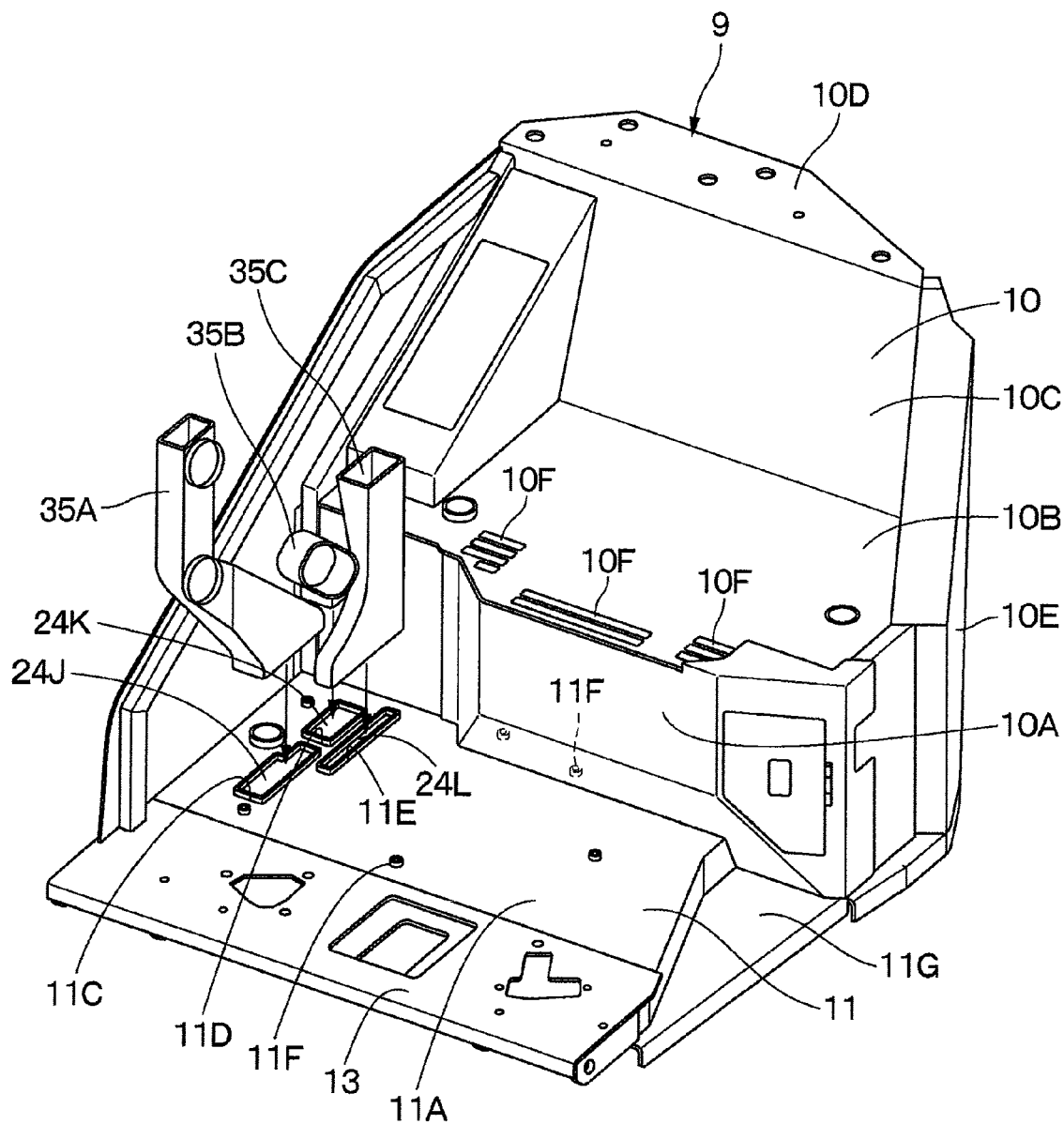
FIG. 12 is an exploded perspective view, taken from the same position as in FIG. 5, of a state in which the air conditioner ducts separated from the footrest section of the floor member.

As shown in FIG. 10, the indoor unit 23 is constituted by the box body 24 for forming an outer shell, a fan 25 which is provided on the upstream side within the box body 24 and delivers toward the air conditioner duct 33 the air sucked into the box body 24, an evaporator 26 accommodated in the box body 24 by being located downstream of the fan 25, the heater core 27 disposed downstream of the evaporator 26, and a flow direction changing mechanism 28 located downstream of the heater core 27 and adapted to change over the supply direction of the conditioned air.

Here, the box body 24 of the indoor unit 23 is formed as a casing having a rectangular parallelepiped-shaped closed structure which, in a plan view, has a rectangular shape extending in the left-right direction, is hence elongated in the left-right direction, and is flattened in the vertical direction. Namely, the box body 24 is largely constituted by a rectangular bottom surface portion 24A located at the bottom and extending in the left-right direction, a front surface portion 24B, a rear surface portion 24C, a left side surface portion 24D, and a right side surface portion 24E which form peripheral surfaces extending upwardly from peripheries of the bottom surface portion 24A, and a rectangular top surface portion 24F extending in the left-right direction to close upper ends of these side surface portions 24B to 24E.

The bolt through holes 24G serving as fastening member insertion holes are formed at six locations corresponding to the six female screw holes 11F of the footrest section 11 on the box body 24, and the below-described bolts 32 are inserted into the respective bolt through holes 24G. The top surface portion 24F of the box body 24 opposes the unit mounting surface 12 formed in the lower surface 11B of the footrest section 11 in a state of abutment against or close proximity to it.

The left side surface portion 24D located on the door 17F side of the cab box 17 is located on the upstream side in the flowing direction of air inside the box body 24. This left side surface portion 24D is provided with an air intake port 24H for admitting air into the box body 24.

Meanwhile, the front side air outlet port 24J, the foot side air outlet port 24K, and the rear side air outlet port 24L for discharging the conditioned air from the box body 24 are provided on the downstream side of the box body 24 which is on the opposite side in the left-right direction to the door 17F of the cab box 17, namely, on the right end side of the top surface portion 24F. The front side air outlet port 24J, the foot side air outlet port 24K, and the rear side air outlet port 24L extend upwardly in frame shape so as to project upwardly of the upper surface 11A of the footrest section 11.

The front side air outlet port 24J located on the front side of the top surface portion 24F is for allowing the conditioned air directed toward the front side of the operating room 18 and the operator seated in the operator's seat 14 to flow out, and a below-described front side supply duct 35A is connected thereto. The foot side air outlet port 24K located on the rear side of the front side air outlet port 24J is for allowing the conditioned air directed toward the operator's feet to flow out, and a below-described foot side supply duct 35B is connected thereto. Further, the rear side air outlet port 24L located on the left side of the foot side air outlet port 24K is for allowing the conditioned air directed toward the rear side of the operator's seat 14 to flow out, and a below-described rear side supply duct 35C is connected thereto.

The cooling fan 25 is provided on the upstream side (left side) in the box body 24, and the fan 25 is for allowing the air admitted from the air intake port 24H to be circulated toward the air outlet ports 24J, 24K, and 24L.

The evaporator 26 is accommodated in the box body 24, and the evaporator 26 is disposed in the vicinity of the downstream side (right side) of the fan 25. This evaporator 26 is for cooling the air by utilizing vaporization heat at the time of evaporation of the refrigerant, and is connected to such as the condenser 21 and the receiver dry 22 of the outdoor unit through the below-described refrigerant pipes 30.

The heater core 27 for heating is accommodated in the box body 24, and the heater core 27 is disposed in the vicinity of the downstream side (right side) of the evaporator 26. This heater core 27 is for heating the air by utilizing engine cooling water heated by the engine 6, and is connected to the radiator 7A through the below-described refrigerant pipes 30.

The flow direction changing mechanism 28 is accommodated in the box body 24 by being located between the heater core 27 and the air outlet ports 24J, 24K, and 24L. This flow direction changing mechanism 28 is for effecting a changeover among the air outlet ports 24J, 24K, and 24L from which the conditioned air is supplied.

Figure 7:
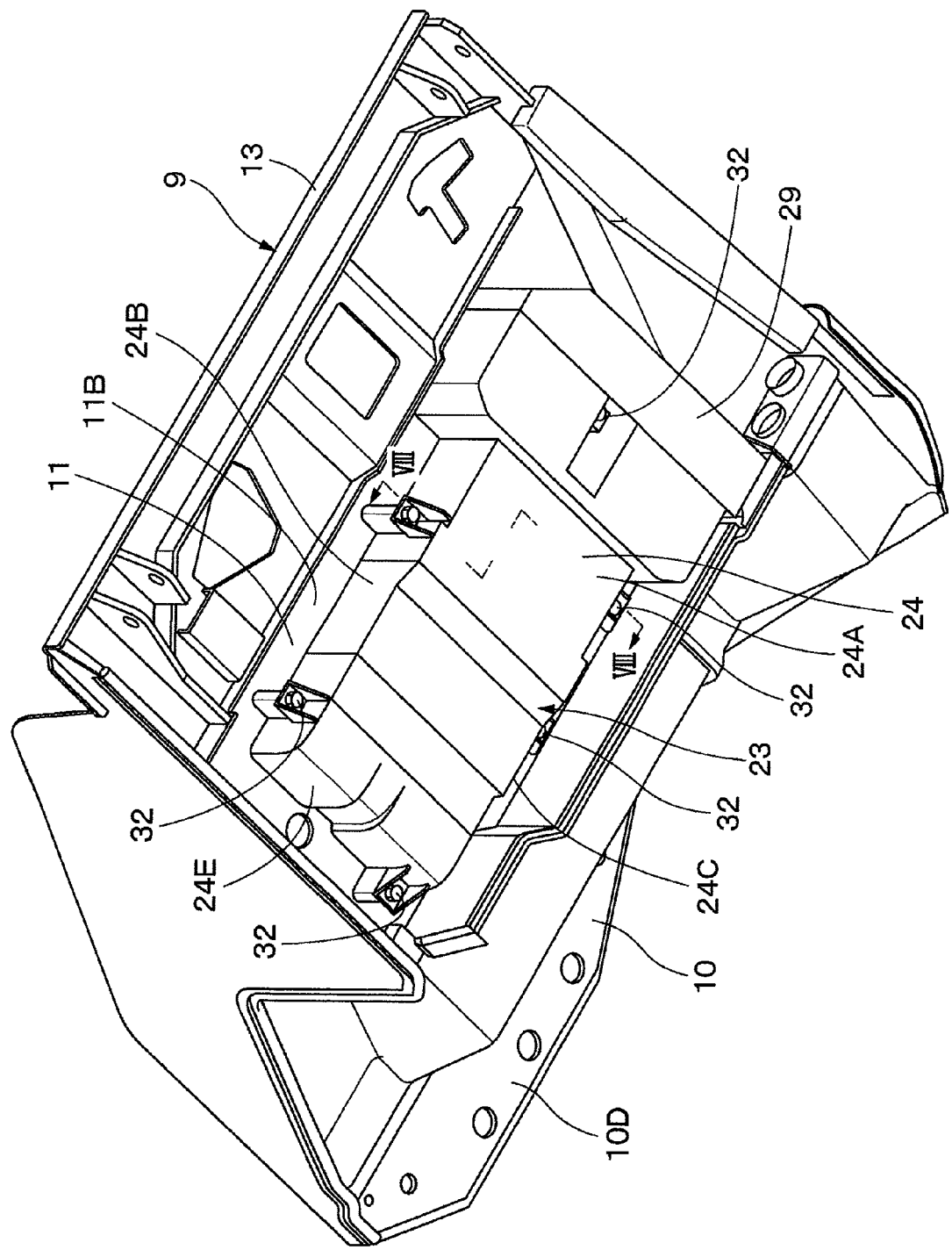
FIG. 7 is an external perspective view, taken from the same position as in FIG. 6, of a state in which an indoor unit is mounted on a lower surface side of a footrest section of the floor member.
Figure 9:
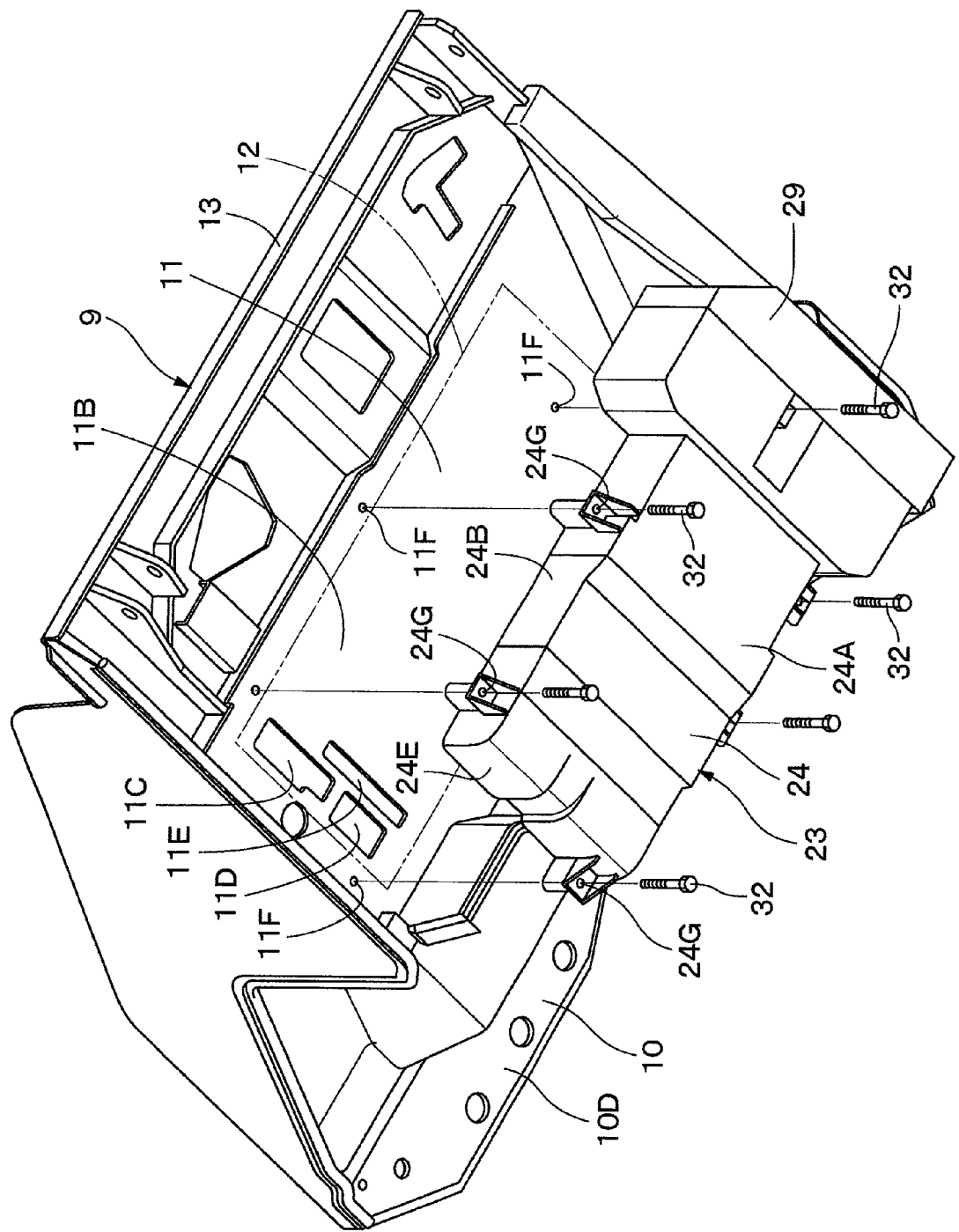
FIG. 9 is an exploded perspective view, taken from the same position as in FIG. 6, of a state in which the indoor unit is separated from the footrest section of the floor member.

It should be noted that, as shown in FIGS. 7 and 9, an internal/external air changing mechanism 29 is mounted in the indoor unit 23 by being located in a left end portion of the box body 24. This internal/external air changing mechanism 29 is for changing over the air to be sucked by the fan 25 between the internal air inside the operating room 18 and the external air outside it.

The refrigerant pipes 30 are for connecting the condenser 21 of the outdoor unit 20 and the evaporator 26 of the indoor unit 23. The hot water pipes 31 are for connecting the radiator 7A of the outdoor unit 20 and the heater core 27 of the indoor unit 23. As shown in FIG. 3, these refrigerant pipes 30 and hot water pipes 31 are connected all the time while tilting up the floor member 9 and extend in such a manner as to turn back at a front side position of the revolving frame 5 so as not to hamper the maintenance operation.

Indicated at 32 are a plurality of, for example, six, bolts which form fastening members. As these bolts 32 are inserted into the respective bolt through holes 24G of the box body 24 from below, and their distal end sides are threadedly secured to the female screw holes 11F of the footrest section 11, the indoor unit 23 can be mounted on the lower surface 11B (unit mounting surface 12) of the footrest section 11.

The indoor unit 23 thus constructed is abutted from below against the unit mounting surface 12 formed in the lower surface 11B of the footrest section 11 of the floor member 9. In this state, the bolts 32 inserted in the respective bolt through holes 24G of the box body 24 are threadedly secured to the female screw holes 11F of the footrest section 11. In consequence, the indoor unit 23 can be directly mounted on the unit mounting surface 12 in a suspended state by using the bolts 32.

Indicated at 33 is the air conditioner duct (see FIGS. 4 and 11) provided at the right end side of the footrest section 11 of the floor member 9, and the air conditioner duct 33 is constituted by a duct cover 34, the front side supply duct 35A, the foot side supply duct 35B, and the rear side supply duct 35C. Here, the duct cover 34 is provided in such a manner as to extend from the right side toward the front side of the operator's seat 14, a front side discharge port 34A for discharging the conditioned air toward the front side of the operating room 18 is provided on its left surface side, and an operator's seat side discharge port 34B for discharging the conditioned air toward the operator seated in the operator's seat 14 is provided on its upper side. A foot side discharge port 34C for discharging the conditioned air toward the operator's feet is provided rearwardly of the front side discharge port 34A. Further, a rear side discharge port (not shown) for discharging the conditioned air to the overall operating room 18 is provided on the rear side of the operator's seat 14 separately from the duct cover 34.

Meanwhile, the front side supply duct 35A of the air conditioner duct 33 is for guiding the conditioned air from the indoor unit 23 to the front side discharge port 34A and the operator's seat side discharge port 34B. The foot side supply duct 35B is for guiding the conditioned air from the indoor unit 23 to the foot side discharge port 34C. Further, the rear side supply duct 35C is for guiding the conditioned air from the indoor unit 23 to the rear side discharge port.

Here, a proximal end portion of the front side supply duct 35A for constituting the air conditioner duct 33 is mounted in an externally fitted state on the front side air outlet port 24J of the box body 24 of the indoor unit 23 which projects upwardly from the outlet port mounting opening 11C of the footrest section 11. Similarly, a proximal end portion of the foot side supply duct 35B is mounted in an externally fitted state on the foot side air outlet port 24K of the box body 24 which projects upwardly from the outlet port mounting opening 11D of the footrest section 11. A proximal end portion of the rear side supply duct 35C is mounted in an externally fitted state on the rear side air outlet port 24L of the box body 24 which projects upwardly from the outlet port mounting opening 11E of the footrest section 11. Therefore, even when the footrest section 11 is washed with water, it is possible to prevent the cleaning water from entering the respective outlet ports 24J, 24K, and 24L of the box body 24.

It should be noted that indicated at 36 is the counterweight (see FIGS. 2 and 3) provided on a rear portion of the revolving frame 5, and the counterweight 36 is for keeping a weight balance with the working mechanism 4. The counterweight 36 is formed in such a manner as to be curved in a circular arc shape so as to cover the engine 6 from behind. Further, the counterweight 36 constitutes a support structure for mounting the mounting plate 10D of the operator's seat mounting section 10 for constituting the floor member 9 on the revolving frame 5 side.

The hydraulic excavator 1 in accordance with the first embodiment has the above-described construction, and its operation will be explained.

As the operator, who entered the operating room 18 and is seated in the operator's seat 14, operates the operating levers/pedals 16 for traveling, the lower traveling structure 2 is caused to travel. Meanwhile, by operating the left and right operating levers 15 for work operation, the operator is able to operate the working mechanism 4 and the like to perform such as the operation of excavating earth and sand.

Here, during the above-described work operation, the indoor unit 23 of the air conditioner 19 is driven to improve the environment of the operating room 18. At this time, the indoor unit 23 sucks in the air inside or outside the operating room 18 and cools this air by the evaporator 26 in the box body 24 or heats it by the heater core 27 therein to convert it into conditioned air. By selecting a supply direction by the flow direction changing mechanism 28, it is possible to discharge the conditioned air to a desired location within the operating room 18 and regulate the temperature of the operating room 18 to an appropriate level.

Further, in cases where maintenance of the indoor unit 23 is performed, the indoor unit 23 can be exposed by tilting up the rear side of the floor member 9 together with such as the operator's seat 14 and the indoor unit 23 by using the front side as a fulcrum (see FIG. 3). In this state, the indoor unit 23 can be dismounted by loosening the bolts 32, thereby making it possible to perform the maintenance operation.

Thus, according to the first embodiment, the lower surface 11B side of the footrest section 11 for forming the floor member 9 is used as the unit mounting surface 12, and the box body 24 of the indoor unit 23 is abutted against this unit mounting surface 12 from below. In this state, the box body 24 of the indoor unit 23 is arranged to be mounted directly to the unit mounting surface 12 by means of the bolts 32. In consequence, the indoor unit 23 can be mounted in a suspended state to the unit mounting surface 12 of the footrest section 11 by virtue of a simple mounting structure using the bolts 32.

Accordingly, since the footrest section 11 of the floor member 9 is sufficient if the indoor unit 23 can be mounted to the unit mounting surface 12 on the lower surface 11B side by means of the bolts 32, it is unnecessary to additionally provide special processing or parts. Namely, the footrest section 11 can be formed as a simple flat surface-shaped plate in which the female screw holes 11F are merely provided.

As a result, since the footrest section 11 of the floor member 9 is not provided with an opening for disposing the indoor unit 23, it is unnecessary to provide a seal member for sealing this opening, and it is possible to reliably prevent water from entering the indoor unit 23 side at the time of washing the interior of the operating room 18 with water. In consequence, at the time of washing the interior of the operating room 18 with water, it is unnecessary to give extra consideration to the indoor unit 23 being splashed with water, so that the cleaning operation can be performed efficiently. Furthermore, it is possible to reduce the number of parts such as a seal member, a tray, and a cover as well as man-hour for processing the footrest section which have been required in the conventional art.

Meanwhile, the outlet port mounting openings 11C, 11D, and 11E are provided in the footrest section 11 of the floor member 9 by being located in the recessed portion on the right side. The arrangement provided is such that the outlet ports 24J, 24K, and 24L of the box body 24 of the indoor unit 23 are mounted at the respective outlet port mounting openings 11C, 11D, and 11E in such a manner as to project to the upper side, and the supply ducts 35A, 35B, and 35C of the air conditioner duct 33 are mounted in an externally fitted state to these outlet ports 24J, 24K, and 24L. In consequence, even in the cases where the footrest section 11 is washed with water, it is possible to prevent cleaning water from entering the outlet ports 24J, 24K, and 24L of the box body 24, thereby making it possible to improve the service life and reliability of the air conditioner 19.

Furthermore, the floor member 9 can be tilted up and down with respect to the revolving frame 5 by using the front side position as a tilting fulcrum. In consequence, in the state in which the floor member 9 is tilted up, the indoor unit 23 can be exposed to the outside, so that the mounting and dismounting operation, inspection operation, repair operation, and the like can be performed easily.

Figure 14:
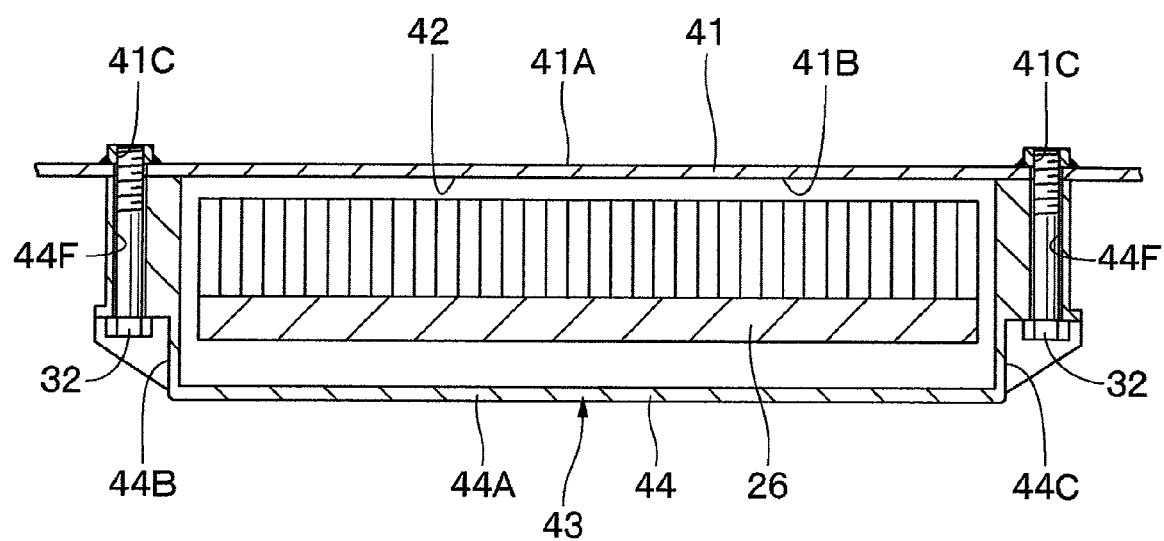
FIG. 14 is an enlarged cross-sectional view, taken from the same position as in FIG. 8, of the footrest section of the floor member and the indoor unit in accordance with a second embodiment.
Figure 15:
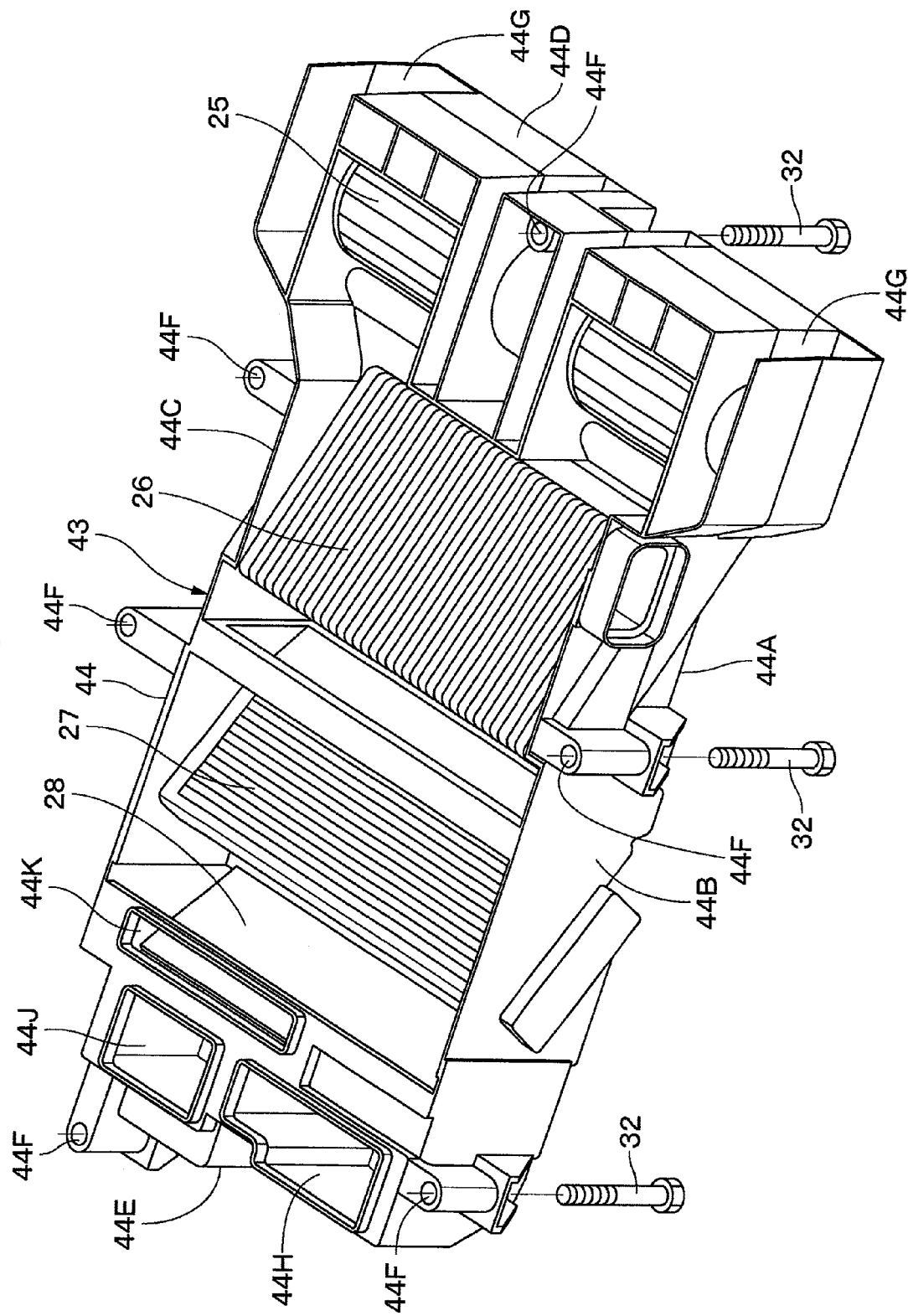
FIG. 15 is an external perspective view illustrating in enlarged form the indoor unit together with bolts shown in FIG. 14.

Next, FIGS. 14 and 15 show a second embodiment of the present invention. The characteristic of this embodiment lies in an arrangement in which the box body of the indoor unit is formed as a frame-like structure whose upper side is open, and the unit mounting surface of the footrest section forms a closing surface which closes the upper side of the box body when the box body is mounted on the unit mounting surface. It should be noted that, in the second embodiment, the component elements that are identical to those of the foregoing first embodiment will be simply denoted by the same reference numerals to avoid repetitions of similar explanations.

In FIG. 14, indicated at 41 is a footrest section of the floor member in accordance with the second embodiment. In substantially the same way as the footrest section 11 in accordance with the above-described first embodiment, this footrest section 41 is formed as a substantially rectangular flat plate which is elongated in the left-right direction, and the footrest section 41 has an upper surface 41A on which the operator rests his or her feet and a lower surface 41B on which a below-described indoor unit 43 is mounted. A plurality of (only two are shown) female screw holes 41C, in which the bolts 32 for mounting the indoor unit 43 are threadedly secured, are provided in the upper surface 41A of the footrest section 41.

Here, indicated at 42 is a unit mounting surface which is provided on the lower surface 41B side of the footrest section 41, and this unit mounting surface 42 forms a closing surface which closes the upper surface of a box body 44 of the below-described indoor unit 43. Specifically, the box body 44 of the indoor unit 43 can be directly mounted on the unit mounting surface 42 in a suspended state and in this mounted state, the unit mounting surface 42 closes the upper surface of the box body 44.

Designated at 43 is the indoor unit in accordance with the second embodiment which is provided on the footrest section 41. As shown in FIG. 15, this indoor unit 43 is largely constituted by the box body 44 for forming an outer shell, as well as the fan 25, the evaporator 26, the heater core 27, and the flow direction changing mechanism 28 which are provided in the box body 44.

The box body 44 in accordance with the second embodiment is formed by a rectangular bottom surface portion 44A extending in the left-right direction, as well as a front surface portion 44B, a rear surface portion 44C, a left side surface portion 44D, and a right side surface portion 44E which form peripheral surfaces extending upwardly from peripheries of the bottom surface portion 44A. Accordingly, the box body 44 is formed as a bottomed and top-open frame-like structure (casing) having a rectangular parallelepiped shape which, as a whole, is elongated in the left-right direction and is flattened in the vertical direction and whose upper side is open. Bolt through holes 44F serving as fastening member insertion holes are formed on the box body 44 at positions corresponding to the respective female screw holes 41C of the footrest section 41, and the bolts 32 are inserted in the respective bolt through holes 44F.

An air intake port 44G for admitting air into the box body 44 is provided in the left side surface portion 44D located on the upstream side which is the door 17F side of the cab box 17. Meanwhile, a front side air outlet port 44H, a foot side air outlet port 44J, and a rear side air outlet port 44K are provided in an upper portion on the right side which is the downstream side of the box body 44.

The front side air outlet port 44H located on the front side is for allowing the conditioned air directed toward the front side of the operating room 18 and the operator seated in the operator's seat 14 to flow out, and the front side supply duct 35A is connected to the front side air outlet port 44H with the footrest section 41 sandwiched therebetween. The foot side air outlet port 44J located on the rear side of the front side air outlet port 44H is for allowing the conditioned air directed toward the operator's feet to flow out, and the foot side supply duct 35B is connected to the foot side air outlet port 44J with the footrest section 41 sandwiched therebetween. Further, the rear side air outlet port 44K located on the left side of the foot side air outlet port 44J is for allowing the conditioned air directed toward the rear side of the operator's seat 14 to flow out, and the rear side supply duct 35C is connected to the rear side air outlet port 44K with the footrest section 41 sandwiched therebetween.

Here, although the upper surface of the box body 44 is open, the box body 44 is formed in a frame-like structure by making use of the unit mounting surface 42 of the footrest section 41 as its top surface portion. In consequence, the box body 44 can be formed to be small in its vertical dimension by the amount in which its top surface portion is omitted. Moreover, by merely dismounting the box body 44 from the footrest section 41, it is possible to perform inspection operation and repair operation of the fan 25, the evaporator 26, the heater core 27, and the like therein.

As for the indoor unit 43 in accordance with the second embodiment thus constructed, its box body 44 is abutted from below against the unit mounting surface 42 of the footrest section 41. In this state, the bolts 32 inserted in the respective bolt through holes 44F of the box body 44 are threadedly secured to the female screw holes 41C of the footrest section 41. As a result, the indoor unit 43 can be directly mounted on the unit mounting surface 42 in a suspended state by using the bolts 32. In this state, the upper opening of the box body 44 can be closed by the unit mounting surface 42 (footrest section 41).

As such, also with the second embodiment thus constructed, it is possible to obtain substantially similar operational effects to those of the above-described first embodiment. In particular, in the second embodiment, the box body 44 of the indoor unit 43 is formed as a bottomed container with its upper side open by the bottom surface portion 44A as well as the front surface portion 44B, the rear surface portion 44C, the left side surface portion 44D, and the right side surface portion 44E for forming the peripheral surfaces, and this box body 44 is arranged to be mounted on the unit mounting surface 42 of the footrest section 41. In consequence, the indoor unit 43 is able to make use of the unit mounting surface 42 of the footrest section 41 as the top surface portion of the box body 44.

As a result, since the height dimension of the indoor unit 43 (box body 44) can be made small by the amount in which the top surface portion is omitted, the height dimension of the upper revolving structure 3 can be reduced to a low level, making it possible to enhance stability during traveling and work operation. In addition, the accommodating space on the lower side of the floor member 9 above the revolving frame 5 can be made large, so that mounted equipment such as control valves can be disposed efficiently therein. Furthermore, at the time of performing inspection operation or repair operation of the indoor unit 43, by merely dismounting the indoor unit 43 from the footrest section 41 it is possible to inspect or repair the fan 25, the evaporator 26, the heater core 27, and the like therein without needing to disassemble the box body 44, thereby making it possible improve the operational efficiency.

It should be noted that, in the first embodiment, it is explained by citing as an example the case in which both the evaporator 26 for cooling the air and the heater core 27 for heating the air are provided in the box body 24 of the indoor unit 23. However, the present invention is not limited to the same, and, for example, in a hydraulic excavator which is used in work sites where the air temperature is low, only the heater core may be provided by omitting the evaporator so as to provide heating exclusively. On the other hand, in a hydraulic excavator which is used in work sites where the air temperature is high, only the evaporator may be provided by omitting the heater core so as to provide cooling exclusively. This arrangement can similarly be applied to the second embodiment as well.

Meanwhile, in the first embodiment, the female screw holes 11F of the footrest section 11 and the bolt through holes 24G of the box body 24 are respectively provided at six locations, and the box body 24 is arranged to be mounted on the footrest section 11 by means of the six bolts 32. However, the present invention is not limited to the same, and, for example, the female screw holes 11F of the footrest section 11 and the bolt through holes 24G of the box body 24 may be respectively provided at not more than five locations or not less than seven locations, and the box body 24 may be arranged to be mounted on the footrest section 11 by means of bolts 32 in a number corresponding thereto. This arrangement can similarly be applied to the second embodiment as well.

Furthermore, in the embodiment, it is explained by citing as an example of the hydraulic excavator 1 of cab specifications having the crawler type lower traveling structure 2 as the construction machine. However, the present invention is not limited to the same, and may be applied to a hydraulic excavator or the like having, for example, a wheel type lower traveling structure.

DESCRIPTION OF REFERENCE NUMERALS

1: Hydraulic excavator (Construction machine)
2: Lower traveling structure
3: Upper revolving structure
4: Working mechanism
5: Revolving frame
9: Floor member
10: Operator's seat mounting section
11, 41: Footrest section
11A, 41A: Upper surface
11B, 41B: Lower surface
11C, 11D, 11E: Outlet port mounting opening
11F, 41C: Female screw hole
12, 42: Unit mounting surface
14: Operator's seat
17: Cab box
17A: Front panel
17B: Rear panel
17C: Left side panel (One side)
17D: Right side panel
17E: Top panel 17F: Door
18: Operating room
19: Air conditioner
20: Outdoor unit
21: Condenser
23, 43: Indoor unit
24, 44: Box body
24A, 44A: Bottom surface portion
24B, 44B: Front surface portion (Peripheral surface)
24C, 44C: Rear surface portion (Peripheral surface)
24D, 44D: Left side surface portion (Peripheral surface)
24E, 44E: Right side surface portion (Peripheral surface)
24F: Top surface portion
24G, 44F: Bolt through hole (Fastening member insertion hole)
24H, 44G: Air intake port
24J, 44H: Front side air outlet port
24K, 44J: Foot side air outlet port
24L, 44K: Rear side air outlet port
25: Fan
26: Evaporator
27: Heater core
30: Refrigerant pipe
31: Hot water pipe
32: Bolt (Fastening member)
33: Air conditioner duct
34: Duct cover
35A: Front side supply duct
35B: Foot side supply duct
35C: Rear side supply duct

The invention claimed is:

1. A construction machine including an automotive lower traveling structure, an upper revolving structure which is swingably mounted on said lower traveling structure, and a working mechanism liftably mounted on said upper revolving structure,
said upper revolving structure being provided with a revolving frame forming a support structure; a floor member which is provided on said revolving frame, a rear side of which serves as a seat mounting section for mounting a seat, and a front side of which serves as a footrest section on which an operator rests his or her feet; a cab box which is disposed to cover an upper side of said floor member to form an operating room above said floor member and which has on one side thereof a door; and an indoor unit which is disposed on said floor member and constitutes a part of an air conditioner for supplying sucked air into an interior of said operating room as conditioned air; wherein:
said footrest section is formed as a flat plate body on which an operator can rest his or her feet,
a lower surface side of said plate body is formed as a unit mounting surface which the indoor unit abuts from a lower side to be mounted thereon,
said indoor unit is arranged to be disposed in a suspended state on said unit mounting surface by being mounted on said unit mounting surface by fastening members, and
said indoor unit includes a box body constituted by a closed structure having a bottom surface, peripheral surfaces, and a top surface which form an outer shell thereof, a fan disposed in said box body to generate a flow of air, and an evaporator and/or a heater core disposed in said box body to condition air, and said indoor unit is mounted on said unit mounting surface in a state in which said top surface of said box body is opposed to said unit mounting surface of said footrest section.

2. The construction machine according to claim 1, wherein a plurality of female screw holes are disposed in said footrest section at peripheries of said unit mounting surface, fastening member insertion holes are disposed in said indoor unit at positions corresponding to said female screw holes, and said indoor unit is arranged to be fastened to said unit mounting surface by said fastening members inserted in said fastening member insertion holes and secured to said female screw holes.

3. A construction machine including an automotive lower traveling structure, an upper revolving structure which is swingably mounted on said lower traveling structure, and a working mechanism liftably mounted on said upper revolving structure,
said upper revolving structure being provided with a revolving frame forming a support structure; a floor member which is provided on said revolving frame, a rear side of which serves as a seat mounting section for mounting a seat, and a front side of which serves as a footrest section on which an operator rests his or her feet; a cab box which is disposed to cover an upper side of said floor member to form an operating room above said floor member and which has on one side thereof a door; and an indoor unit which is disposed on said floor member and constitutes a part of an air conditioner for supplying sucked air into an interior of said operating room as conditioned air; wherein:
said footrest section is formed as a flat plate body on which an operator can rest his or her feet,
a lower surface side of said plate body is formed as a unit mounting surface which the indoor unit abuts from a lower side to be mounted thereon,
said indoor unit is arranged to be disposed in a suspended state on said unit mounting surface by being mounted on said unit mounting surface by fastening members, and
said indoor unit includes a box body of a frame-like structure whose upper side is opened and having a bottom surface and peripheral surfaces which form an outer shell thereof, a fan disposed in said box body to generate a flow of air, and an evaporator and/or a heater core disposed in said box body to condition air, and said unit mounting surface of said footrest section forms a closing surface which closes an upper side of said box body when said box body is mounted on said unit mounting surface.

4. The construction machine according to claim 1, wherein said box body in a plan view is formed in a rectangular shape, air intake ports for admitting air are provided in said box body by being located on a side of said door of said cab box, and air outlet ports for discharging the conditioned air are provided in said box body by being located on an opposite side to said door, said evaporator and/or said heater core being arranged to be disposed between said air intake ports and said air outlet ports inside said box body.

5. The construction machine according to claim 3, wherein said box body in a plan view is formed in a rectangular shape, air intake ports for admitting air are provided in said box body by being located on a side of said door of said cab box, and air outlet ports for discharging the conditioned air are provided in said box body by being located on an opposite side to said door, said evaporator and/or said heater core being arranged to be disposed between said air intake ports and said air outlet ports inside said box body.

6. The construction machine according to claim 3, wherein a plurality of female screw holes are disposed in said footrest section at peripheries of said unit mounting surface, fastening member insertion holes are disposed in said indoor unit at positions corresponding to said female screw holes, and said indoor unit is arranged to be fastened to said unit mounting surface by said fastening members inserted in said fastening member insertion holes and secured to said female screw holes.

* * * * *